United States Patent [19]
Cline et al.

[11] Patent Number: 5,733,966
[45] Date of Patent: Mar. 31, 1998

[54] POLYURETHANE CONTACT ADHESIVES WITH IMPROVED TEMPERATURE RESISTANCE PROPERTIES

[75] Inventors: Robert L. Cline, Paden City; James W. Rosthauser, Glendale, both of W. Va.; Peter H. Markusch, McMurray, Pa.

[73] Assignee: Bayer Corporation, Pittsburgh, Pa.

[21] Appl. No.: 787,066

[22] Filed: Jan. 22, 1997

Related U.S. Application Data

[63] Continuation of Ser. No. 481,585, Jun. 7, 1995, abandoned.

[51] Int. Cl.$^6$ .................... C08J 3/00; C08K 3/20; C08L 75/00; C08G 18/00
[52] U.S. Cl. ................... 524/590; 524/589; 528/44; 528/60; 528/66; 528/76; 528/77; 528/85
[58] Field of Search ...................... 524/589, 590; 528/44, 60, 66, 76, 77, 85

[56] References Cited

U.S. PATENT DOCUMENTS

| | | | |
|---|---|---|---|
| 3,779,794 | 12/1973 | De Santis | 117/72 |
| 4,156,064 | 5/1979 | Falkenstein et al. | 528/46 |
| 4,624,996 | 11/1986 | Rizk et al. | 525/453 |
| 4,625,012 | 11/1986 | Rizk et al. | 528/28 |
| 5,102,714 | 4/1992 | Mobley et al. | 428/95 |
| 5,227,409 | 7/1993 | Mobley et al. | 521/167 |

*Primary Examiner*—Patrick D. Niland
*Attorney, Agent, or Firm*—Joseph C. Gil; N. Denise Brown

[57] ABSTRACT

The present invention relates to highly elastic polyurethane contact adhesives, a process to coat substrates with these contact adhesives, and the coated substrates produced by this process. This invention requires a) a polyisocyanate with a functionality of less than about 4 and b) a polyol blend comprising 1) about 90 to 100% polyethers with molecular weights from about 1,800 to 12,000 and average functionality from about 1.5 to about 4, and 2) up to about 10% of chain extenders with molecular weights from about 60 to 400 and average functionality from about 1.5 to about 3. The functionalities and amounts of components a) and b) are such that the molecular weight between crosslinks is from about 7,000 to about 16,000 and the equivalent ratio of isocyanate groups to isocyanate-reactive groups is from about 80:100 to about 120:100 and the urethane group content is from about 1 to about 8%. It is preferred that at least one of components a) and b) have a functionality of greater than about 2.2.

9 Claims, No Drawings

POLYURETHANE CONTACT ADHESIVES WITH IMPROVED TEMPERATURE RESISTANCE PROPERTIES

This application is a continuation of application Ser. No. 08/481,585 filed Jun. 7, 1995, abandoned.

BACKGROUND OF THE INVENTION

The present invention relates to highly elastic polyurethane contact adhesives and a process to coat substrates with them. This invention requires a) a polyisocyanate with a functionality of less than about 4 and b) a polyol blend comprising 1) about 90 to 100% polyethers with molecular weights from about 1,800 to 12,000 and average functionality from about 1.5 to about 4, and 2) up to about 10% of chain extenders with molecular weights from about 60 to 400 and average functionality from about 1.5 to about 3. The functionalities and amounts of components a) and b) are such that the molecular weight between crosslinks is from about 7,000 to about 16,000 and the equivalent ratio of isocyanate groups to isocyanate-reactive groups is from about 80:100 to about 120:100 and the urethane group content is from about 1 to about 8%.

Polyurethane adhesives and sealants of various types are well known. See, for example, U.S. Pat. Nos. 3,779,794, 4,156,064, 4,624,996, and 4,625,012.

In certain applications, it is desirable to provide an elastomeric material that can be applied to a flexible substrate in the liquid state and cured to provide an adhesive layer. This allows this flexible substrate to be attached to and in some cases subsequently removed from another surface.

Materials of this type are described in, for example, U.S. Pat. Nos. 5,102,714 and 5,227,409. These patents relate to adhesives for adhering carpet onto flooring based on a) a polyol mixture having an average functionality of 2.2 or less and equivalent weight of at least 500 and containing from 10 to 70 mole percent of monoalcohol and optionally up to 10% of a chain extender with an equivalent weight of from about 30 to 500, with b) a polyisocyanate mixture having an average functionality of about 2.2 or less.

Adhesives of this type are not useful in certain applications because of their undesirable tendency to soften and lose adhesive properties at temperatures slightly above room temperature. This is especially undesirable when the flexible substrate will be attached to a vertical surface and can result in the substrate releasing from the surface when it is heated.

The polyurethane contact adhesives of the present invention have several advantages. They can be applied to the substrates in liquid form and cured to form permanently tacky elastomeric layers useful as contact adhesives. The softening points of the reacted adhesives is sufficiently high so that the compositions do not lose their adhesive strength and the substrates thus remain intact on vertical surfaces when heated above normal room temperatures. The adhesives have sufficient flexibility so that they are also useful on flexible substrates. Another advantage of the present invention is that the contact adhesives can be attached to and removed from a substrate, and are reusable.

DESCRIPTION OF THE INVENTION

The present invention relates to highly elastic polyurethane contact adhesives and a process to coat substrates with them. These elastomeric compositions are permanently tacky, and comprise a) a polyisocyanate having a functionality of less than about 4; and b) a polyol component comprising 1) about 90 to 100% by weight, based on 100% by weight of component b), of at least one polyether having a molecular weight of from about 1800 to 12,000 and an average functionality from about 1.5 to about 4, and 2) up to about 10% of chain extenders with molecular weights from about 60 to 400 and average functionality from about 1.5 to about 3. The functionalities and amounts of components a) end b) are such that the molecular weight between crosslinks is from about 7,000 to about 16,000 and the equivalent ratio of isocyanate groups to isocyanate-reactive groups is from about 80:100 to about 120:100 and the urethane group content is from about 1 to about 8%.

The molecular weight between crosslinks is also described as the mean chain length between crosslinking sites or the molecular weight per branch point and is abbreviated by $M_c$ and calculated according to the method of Bolin, described in "Journal Chem. & Eng. Data", Vol. 4, No. 3, July, 1959, page 261. It is preferred that the molecular weight between crosslinks is from about 8,000 to about 16,000, and most preferably between about 8,000 and about 13,000 atomic mass units.

It is preferred that the urethane group concentration is from about 1 to about 7%, preferably from about 2 to 6%, and most preferably from about 2 to 4%. Correspondingly, in accordance with the ranges set forth in the present invention, the amount of low molecular weight chain extender b) 2) is thus limited to less than about 80 equivalent percent of the isocyanate reactive component mixture b).

The urethane group content as used herein is defined as:

$$\% \text{ urethane} = \frac{59 \times (\text{OH equivalents}) \times 100}{\text{total weight}}$$

It is preferred that the ratio of isocyanate groups to isocyanate-reactive groups is from about 85:100 to about 115:100, more preferably 90:100 to about 110:100, and most preferably 95:100 to about 105:100.

In a particularly preferred embodiment of the present invention, component a) is selected from the known commercial aliphatic diisocyanates and polyisocyanates. The adhesives containing these aliphatic diisocyanates and polyisocyanates have less tendency to yellow when exposed to heat or light than their aromatic diisocyanate and/or aromatic polyisocyanate based counterparts and thus can be used in application areas where optical clarity and light stability may be required.

In another preferred embodiment, the polyisocyanate is selected from the group consisting of 1) a polymethylene poly(phenyl isocyanate) having an isocyanate group content of from 30 to 33% by weight and having a diphenylmethane diisocyanate content of from 30 to 60% by weight, and 2) a mixture of i) a polymethylene poly(phenyl isocyanate) having an isocyanate group content of from 30 to 33% by weight and having a diphenylmethane diisocyanate content of from 30 to 60% by weight, with ii) a liquid reaction product of methylene bis(phenyl isocyanate), wherein said mixture has an isocyanate group content of from 20 to 30% by weight.

In accordance with the requirement for molecular weight between crosslinks of the present invention, it is preferred that the average functionality of the polyisocyanate or polyisocyanate mixture approaches about 2 when the functionality of the polyol mixture approaches about 4. Conversely, it is preferred that the average functionality of the polyol mixture approaches about 2 when the functionality of the polyisocyanate or polyisocyanate mixture approaches about 4.

It is also preferred that the polyethers b)1) have an average molecular weight of about 1,800 to about 12,000 and an average functionality of about 2 to 3. It is also preferred that b)1) be selected from the group consisting of diols, triols, and mixtures thereof.

Examples of suitable polyisocyanates which may be used as the polyisocyanate component in accordance with the present invention include monomeric diisocyanates, preferably NCO prepolymers and more preferably polyisocyanate adducts. Suitable monomeric diisocyanates may be represented by the formula

in which R represents an organic group obtained by removing the isocyanate groups from an organic diisocyanate having a molecular weight of about 56 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl) methane, 2,4'-dicyciohexylmethane diisocyanate, 1,3- and 1,4-bis(isocyanatomethyl) cyclohexane, bis(4-isocyanato-3-methyl-cyclohexyl) methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/ or 4,4'-diphenylmethane diisocyanate, 1,5-diisocyanato naphthalene and mixtures thereof. Aromatic polyisocyanates containing 3 or more isocyanate groups such as 4,4',4"-triphenylmethane diisocyanate and polymethylene poly (phenylisocyanates) obtained by phosgenating aniline/ formaldehyde condensates may also be used.

In accordance with the present invention, at least a portion of the polyisocyanate component may be present in the form of an NCO prepolymer or a polyisocyanate adduct, more preferably a polyisocyanate adduct. Suitable polyisocyanate adducts are those containing isocyanurate, uretdione, biuret, urethane, allophanate, carbodiimide and/or oxadiazinetrione groups. The polyisocyanates adducts have an average functionality of 2 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a trialkyl phosphine catalyst and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are polyisocyanates containing urethane groups, isocyanurate groups, biuret groups or mixtures of isocyanurate and allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights (Mn) and are determined by end group analysis (OH number). Products obtained by reacting polyisocyanates exclusively with low molecular weight compounds are polyisocyanates adducts containing urethane groups and are not considered to be NCO prepolymers.

Preferred are the known commercial aliphatic diisocyanates and polyisocyanates. Particularly preferred are an aliphatic diisocyanate consisting of isomers of bis(4-isocyanatocyclohexyl) methane, commercially available from Bayer as Desmodur® W, and an aliphatic polyisocyanate consisting mainly of trimers of 1,6-hexamethylene diisocyanate, commercially available from Bayer as Desmodur® N-3300.

The polyol component b) to be used in the process according to the invention comprises components b)1) about 90 to 100% by weight, based on 100% by weight of component b), of at least one polyether having an average functionality of from about 1.8 to 4, preferably from about 2 to 3, and a molecular weight of about 1,800 to 12,000, preferably from about 2,000 to 6,000, and b)2) up to about 10% by weight, based on 100% by weight of component b), of at least one chain extender having a molecular weight of from about 60 to 400 and an average functionality of from about 1.5 to 3.

Examples of some suitable high molecular weight polyethers for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. Mixtures of these starters are also advantageously used to prepare polyethers with the desired functionality of 1.5 to 4 for the present invention. It is preferred to use polyethers which contain substantial amounts of primary hydroxyl groups in terminal positions (greater than 80% by weight, based on all of the terminal hydroxyl groups present in the polyether).

Polyether polyols including polymers of propylene oxide and copolymers of propylene oxide and ethylene oxide are preferably used as component b)1) in the invention. To assure adequate molecular weight in the final permanently tacky elastomers of the present invention, it is preferred that polyethers are used containing a low amount of unsaturation inherent in polyethers prepared using standard anionic polymerization techniques. Polyethers with reduced levels of unsaturation are prepared using special techniques described in, for example, U.S. Pat. Nos. 3,278,457, 3,393,243, 3,829,505, 3,941,849, 4,210,764, 4,355,188, 4,472,560, 4,477,589, 4,721,818, 4,962,237, 5,010,187, 5,070,125, 5,114,619, and 5,266,681, the disclosures of which are herein incorporated by reference.

Preferred polyethers include, for example, those based on ethylene oxide and/or propylene oxide with mono-, di-, tri-, or tetra-functional starters such as, for example, methanol, n-butanol, water, ethylene glycol, propylene glycol, glycerin, trimethylolpropane, ethanolamine derivatives and N-substituted ethanolamines including ethanolamine, N-methyl-ethanolamine, diethanolamine, triethanolamine, and ethylenediamine.

The hydroxyl-functional polyethers of the present invention can be used in admixture with smaller quantities (preferably no more than 30 mole-% relative to the hydroxyl-terminated polyethers) of other known isocyanate-reactive compounds, such as hydroxyl-containing polyesters, polyacetals, polycarbonates, polyesterethers, polyester carbonates, polythioethers, polyamides, polyesteramides, polysiloxanes, polybutadienes, and polyacetones (particularly polyether polyols). These mixtures generally should contain (on a statistical average) two to three isocyanate-reactive end groups. These materials are, however, generally much less preferred because of their higher glass transition temperatures and viscosities. Mixtures of such polymers with themselves or with the hydroxyl-terminated polyethers of the present invention are, of course, also suitable.

Suitable organic diols and triols to be used as component b)2) according to the invention include, for example, diols and triols having a molecular weight of about 60 to 400, preferably about 90 to 300. These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol, 2,2,4-trimethylpentane-1,3-diol, ethanolamine derivatives and N-substituted ethanolamines including ethanolamine, N-methyl-ethanolamine, diethanolamine, and triethanolamine. Preferred diols and triols include, for example diethylene glycol, triethylene glycol, dipropylene glycol, tripropylene glycol, and mixtures thereof.

In accordance with the present invention, it is preferred that components b)1) and b)2) are used as a blend and subsequently mixed with component a). Also, it is preferred that one or more catalysts are included in the blend of components b)1) and b)2).

Some examples of catalysts suitable for use in accordance with the present invention include catalysts such as, for example, metal carboxylates including, for example, tin carboxylates such as, for example, dimethyltin dilaurate, and bismuth carboxylates, such as, for example, bismuth trineodecanoate. Some suitable examples of metal halides include, for example, tin halides and especially tin chlorides such as, for example, dimethyltin dichloride. Suitable examples of ammonium carboxylates include, for example, trimethylhydroxyethylammonium-2-ethylhexanoate (i.e. Dabco TMR). Tin carboxylates such as, for example, dimethyltin dilaurate, and bismuth carboxylates such as, for example, bismuth trineodecanoate are preferred catalysts. Metal chlorides such as, for example, dimethyltin dichloride are also preferred catalysts.

Suitable catalysts also include, for example, tin-sulfur catalysts. Examples of these catalysts include dialkyltin dilaurylmercaptides such as, for example, dibutyltin dilaurylmercaptide and dimethyltin dilauryl-mercaptide. These tin-sulfur catalysts are generally less preferred due to their latent catalytic behavior.

Although generally less preferred because of their tendency to yellow when exposed to light and because of their reduced activity towards promoting the reaction of aliphatic isocyanates with polyethers, trialkyl amines and heterocyclic amines are also suitable for the present invention. Suitable compounds include, for example, trimethylamine; triethylamine; tripropylamine; tributylamine; dimethyl cyclohexylamine; dibutyl cyclohexylamine; dimethyl ethanolamine; triethanolamine; diethyl ethanolamine; ethyl diethanolamine; dimethyl isopropanolamine; triisopropanolamine; triethylenediamine, tetramethyl-1,3-butanediamine; N,N,N',N'-tetramethylethylenediamine; N,N,N',N'-tetramethyl-hexane-diamine-1,6; N,N,N',N',N''-pentamethyl diethylenetriamine; bis(2-dimethylaminoethoxy) methane; N,N,N'-trimethyl-N'-(2-hydroxyethyl ethylenediamine; N,N-dimethyl-N',N'-(2-hydroxyethyl)-ethylenediamine; tetramethylguanidine; N-methylpiperidine; N-ethylpiperidine; N-methylmorpholine; N-ethylmorpholine; 1,4-dimethylpiperidine; 1,2,4-trimethylpiperidine; N-(2- dimethylaminoethyl)-morpholine; 1-methyl-4-(2-dimethylamino)-piperidine; 1,4-diazabicyclo-[2.2.2]octane; 2-methyl-1,4-diazabicyclo[2.2.2]-octane; quinuclidine; 1,5-diazabicyclo[5.4.0]-5-undecene; and 1,5-diazabicyclo-[4.3.0]-5-nonane.

It is also possible to use heat-activated catalysts for the present invention such as amine salts. Some examples of suitable amine salts include aliphatic and aromatic tertiary amine catalysts. Suitable heat-activated amine salts include compounds such as, for example, DABCO 8154 commercially available from Air Products, a formic acid blocked triethylene diamine, and other delayed action catalysts such as DABCO WT, also commercially available from Air Products; and Polycat SA-1 and Polycat SA-102 which are both acid-blocked versions of 1,8-diazabicyclo [5.4.0] undecene-7 (i.e. Polycat DBU) and are commercially available from Air Products.

In another embodiment of the present invention, it is particularly preferred to use a mixture of one or more tin catalyst with one or more amine catalyst. Preferred tin catalysts to be used in the present invention include, for example, dibutyltin dilaurate catalyst (commercially available from Air Products and Chemicals, Inc. as DABCO® T-12), and dimethyltin dilaurate (commercially available from Witco Chemical Corp. as Fomrez® UL-28); and preferred amine catalysts suitable for the present invention include, 33% triethylene diamine in dipropylene glycol (commercially available from Air Products and Chemicals, Inc. as DABCO® 33LV).

In addition, it is of course possible that the adhesive compositions of the present invention include auxiliary agents and additives known in the field of polyurethane chemistry. These include, for example, surfactants, fillers, etc. Higher amounts of most additives other than catalysts are generally less preferred because they can reduce the adhesive strength of the highly elastic polyurethane/urea contact adhesives.

Due to the tendency of polyethers to degrade in the presence of heat or light, and especially in cases where light stability is a requirement for the adhesive, the commercially available light stabilizers known to those skilled in the art should be included in the adhesive formulations. These materials include anti-oxidants and UV-absorbers, for example hindered phenols, benzophenones, hindered amine light stabilizers (HALS, such as adducts of condensation products prepared from acetone and ammonia), benzotriazines and the like. Since many of these materials can migrate to the surface of the, composition during the curing process, it should be determined if the materials reduce the adhesive properties of the compositions. The light stabilizers are typically added alone or in mixtures to the blended b)1) and b)2) polyol portion of the formulation in amounts up to about 3%, preferably less than about 2%, and most preferably about 0.1 to 1% based on the total weight of the adhesive.

The adhesive compositions are applied as one or more layers to substrates by known methods such as spraying, brush coating, immersion or flooding or by means of rollers or doctor blade applicators. The adhesive compositions are particularly suitable to adhere certain flexible substrates such as, for example, clear thermoplastic articles and especially clear thermoplastic polymer films, textiles and other woven or nonwoven natural or synthetic fibers, paper and paper products, leather, or wood to various surfaces, e.g., metals, plastics, wood, cement, concrete or glass. The adhesive compositions according to the invention are particularly suitable to attach these porous, flexible substrates onto glass or sheet steel, for example, for the manufacture of car bodies and auto trim, machine trim panels, vats or containers. The adhesive compositions are especially suited to attach these substrates to extremely smooth surfaces including glass. The surfaces to be coated with the adhesive compositions according to the invention may be treated with suitable primers before the process according to the invention is carried out. The density of adhesives according to the invention can also be lowered by mechanical froth or addition of known blowing agents to the compositions.

After the substrates exemplified above have been coated, the coatings may be cured at either ambient temperature, e.g., by air drying or so-called forced drying, or at elevated temperature. The coated side of the substrate can be protected from prematurely attaching to surfaces or to itself by covering it with coated release papers known to those skilled in the art. The substrates are attached to the surfaces by placing the coated side of the substrate in the desired position on the surface and then exerting pressure on the uncoated side of the substrate.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following materials were used in the examples.

Isocyanate A: a polymethylene poly(phenylisocyanate) containing 43% diphenylmethane diisocyanate monomers and 57% of higher functionality homologs, and having an overall isocyanate group content of about 31.6% and a functionality of 2.8.

Isocyanate B: a 50150 mixture of a polymethylene poly(phenylisocyanate) containing 64% diphenylmethane diisocyanate monomers and about 36% of higher functionality homologs and a 23% NCO prepolymer of 4,4'-diphenylmethane diisocyanate and tripropylene glycol, having an overall isocyanate group content of about 27% and a functionality of about 2.15.

Isocyanate C: an aliphatic diisocyanate consisting of isomers of bis(4-isocyanatocyclohexyl) methane and an isocyanate group content of about 32%.

Isocyanate D: an aliphatic polyisocyanate having an isocyanate group content of about 21.6% and a functionality of about 3.6 consisting mainly of monomers of 1,6-hexamethylene diisocyanate.

Isocyanate E: a polymethylene poly(phenylisocyanate) containing 78% diphenylmethane diisocyanate monomers and 22% of higher functionality homologs, and having an overall isocyanate group content of about 32.8 and a functionality of about 2.2.

Isocyanate F: a 50/50 mixture of a polymethylene poly(phenylisocyanate) containing 43% diphenylmethane diisocyanate monomers and about 57% of higher functionality homologs and a 23% NCO prepolymer of 4,4'-diphenylmethane diisocyanate and tripropylene glycol, having an overall isocyanate content of about 27% and a functionality of about 2.4.

Polyol A: poly (oxyalkylene) polyol having a molecular weight of about 4000 and a functionality of about 2, and prepared by adding a mixture of about 87% propylene oxide and 13% ethylene oxide to propylene glycol such that about 75% of the hydroxyl groups are primary.

Polyol B: a poly (oxyalkylene) polyol having a molecular weight of about 4000 and a functionality of about 2, and prepared by adding a mixture of about 80% propylene oxide and 20% ethylene oxide to propylene glycol such that about 90% of the hydroxyl groups are primary.

Polyol C: a poly (oxyalkylene) polyol having an equivalent weight of about 1600 and a functionality of about 3, and prepared by adding a mixture of about 83% propylene oxide and 17% ethylene oxide to glycerine such that about 85% of the hydroxyl groups are primary.

Polyol D: a poly (oxyalkylene) polyol having an equivalent weight of about 2000 and a functionality of about 3, and prepared by adding a mixture of about 87% propylene oxide and 13% ethylene oxide to glycerine such that about 85% of the hydroxyl groups are primary.

Catalyst A: dibutyltin dilaurate catalyst, commercially available from Air Products and Chemicals, Inc. as DABCO® T-12.

Catalyst B: 33% triethylene diamine in dipropylene glycol, commercially available from Air Products and Chemicals, Inc. as DABCO® 33LV.

Catalyst C: dimethyltin dilaurate commercially available from Witco Chemical Corp. as Fomrez® UL-28).

Testing Procedures

1. Preparation of Test Specimens and Adhesion Test Procedure to Determine Softening Point.

Slightly more than the bottom one inch of a marked 1×7 inch area of a 4×7 inch canvas panel (#8 untreated canvas, commercially available from Wheeling Tent and Awning Company in Wheeling, W. Va.) was coated with adhesive using a #50 wire-wound laboratory coating rod (commercially available from Gardner Testing Instruments in Pompano Beach, Fla.). After 15 minutes curing in an 80° C. oven, a second coat of the same thickness of the adhesive was applied. The panel was cut in half immediately so that 4×3½ inch panels were obtained and laminated with coated sides facing each other. The sample was cured for 1 hr. at 80° C. with a 15 lb. weight placed on top, then the weight was removed and the sample was cured for an additional 16 hrs. at 50° C. The samples were aged at room temperature for one week before softening points were determined.

After aging for one week, three 4×1 inch strips were cut from the laminated panel (discarding the edges) yielding three 1 inch wide peel samples. The samples were pulled back to the 1 inch lines and the upper end was suspended in a forced air oven at 25° C. with a dead load of 1 kilogram attached to the lower end. The samples were conditioned for 15 minutes at 25° C., then the temperature in the oven was raised at a rate of 1 ° C. every 2 minutes. The softening point is the temperature in °C. at which the samples fail by complete separation.

2. Preparation of Test Specimens and Peel Strength Adhesion Test Procedure (pounds per linear inch, pli):

Test specimens were prepared using the same method as used in Softening Point Test. Pull Test were conducted on an Instron Tester at a crosshead speed of 2 inches per minute.

Example 1

(Comparative Example prepared in accordance with U.S. Pat. No. 5,277,409) (Polyol Functionality= 2.24)

9.64 g of Isocyanate C was added to a degassed mixture of 41.25 g of Polyol D and 83.75 g. of Polyol A and 0.81 g Catalyst C at room temperature with stirring. The mixture was stirred at 400 RPM for 2 minutes, degassed for 2 to 3 minutes then an approx. ⅛ in. thick portion was cast into a 6 in.×9 in. Teflon mold. The rest was used to prepare samples, for softening point. Both samples were cured at 80° C. for 1 hr. and then 50° C. for 16 hrs. The polymer was firm, somewhat tough, highly elastic, and tacky. Dirt could be removed from the surface simply by washing with water. The resulting dried polymer retained its original tackiness.

Example 2

(According to the Invention)

7.61 g of Isocyanate C was added to a degassed mixture of 50.0 g of Polyol D and 50.0 g. of Polyol A and 0.65 g Catalyst C at room temperature with stirring. The mixture was stirred at 400 RPM for 2 minutes, degassed for 2 to 3 minutes then an approx. ⅛ in. thick portion was cast into a 6 in.×9 in. Teflon mold. The rest was used to prepare samples for softening point. Both samples were cured at 80° C. for 1 hr. and then 50° C. for 16 hrs. The polymer was firm, somewhat tough, highly elastic, and tacky. Dirt could be removed from the surface simply by washing with water. The resulting dried polymer retained its original tackiness.

Example 3

(According to the Invention)

7.53 g of Isocyanate C was added to a degassed mixture of 100.0 g of Polyol D and 25.0 g of Polyol A and 0.80 g Catalyst C at room temperature with stirring. The mixture was stirred at 400 RPM for 2 minutes, degassed for 2 to 3 minutes, then an approx. ⅛ in. thick portion was cast into a 6 in.×9 in. Teflon mold. The rest was used to prepare samples for softening point. Both samples were cured at 80° C. for 1 hr. and then 50° C. for 16 hrs. The polymer was firm, somewhat tough, highly elastic, and tacky. Dirt could be removed from the surface simply by washing with water. The resulting dried polymer retained its original tackiness.

Example 4

(Comparative Example)

(Polyol Functionality=2.0; Isocyanate Functionality=2.2)

9.59 g of Isocyanate E was added to a degassed mixture of 125.0 g of Polyol A and 0.13 g Catalyst C at room temperature with stirring. The mixture was stirred at 400 RPM for 2 minutes, degassed for 2 to 3 minutes, then an approx. ⅛ in. thick portion was cast into a 6 in.×9 in. Teflon mold. The rest was used to prepare samples for softening point. Both samples were cured at 80° C. for 1 hr. and then 50° C. for 16 hrs. The polymer was firm, somewhat tough, highly elastic, and tacky. Dirt could be removed from the surface simply by washing with water. The resulting dried polymer retained its original tackiness.

Example 5

(Comparative Example)

14.99 g of Isocyanate D was added to a degassed mixture of 125.0 g of Polyol A and 0.84 g Catalyst C at room temperature with stirring. The mixture was stirred at 400 RPM for 2 minutes, degassed for 2 to 3 minutes, then an approx. ⅛ in. thick portion was cast into a 6 in.×9 in. Teflon mold. The rest was used to prepare samples for softening point. Both samples were cured at 80° C. for 1 hr. and then 50° C. for 16 hrs. The polymer was firm, somewhat tough and elastic, but not tacky.

Example 6

(According to the Invention)

11.09 g of Isocyanate B was added to a degassed mixture of 50.0 g of Polyol D and 75.0 g. of Polyol A and 0.14 g Catalyst C at room temperature with stirring. The mixture was stirred at 400 RPM for 2 minutes, degassed for 2 to 3 minutes, then an approx. ⅛ in. thick portion was cast into a 6 in.×9 in. Teflon mold. The rest was used to prepare samples for softening point. Both samples were cured at 80° C. for 1 hr. and then 50° C. for 16 hrs. The polymer was firm, somewhat tough, highly elastic, and tacky. Dirt could be removed from the surface simply by washing with water. The resulting dried polymer retained its original tackiness.

Example 7

(According to the Invention)

4.69 g of Isocyanate F was added to a degassed mixture of 50.0 g of Polyol A and 0.11 g Catalyst C at room temperature with stirring. The mixture was stirred at 400 RPM for 2 minutes, degassed for 2–3 minutes, then an approx. ⅛ in. thick portion was cast into a 6 in.×9 in. Teflon mold. The rest was used to prepare samples for softening point. Both samples were cured at 80° C. for 1 hr. then and 50° C. for 16 hrs. The polymer was firm, somewhat tough, highly elastic, and tacky. Dirt could be removed from the surface simply by washing with water. The resulting dried polymer retained its original tackiness.

| Example | $M_c$* | % Urethane | Peel (pli) | Softening Point |
|---|---|---|---|---|
| 1 | 19,584 | 2.81 | 1.0 | <25° C. |
| 2 | 12,916 | 2.79 | 16.0 | 65° C. |
| 3 | 7,955 | 2.38 | 12.0 | 60° C. |
| 4 | 19,599 | 2.84 | 1.8 | <25° C. |
| 5 | 4,167 | 2.73 | 1.6 | <25° C. |
| 6 | 7,910 | 2.77 | 16.5 | 67° C. |
| 7 | 10,860 | 2.80 | 11.7 | 35° C. |

*$M_c$ represents molecular weight between branch point

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A highly elastic polyurethane contact adhesive composition which is the reaction product of a mixture consisting of
   a) a polyisocyanate or polyisocyanate adduct having a functionality of less than about 4, and
   b) a polyol component consisting of
      1) about 90 to 100% by weight, based on 100% by weight of component b), of at least one polyether having a molecular weight of from about 1,800 to 12,000 and an average functionality of from about 1.5 to about 4, and
      2) up to about 10% by weight, based on 100% by weight of component b), of at least one chain extender containing hydroxyl groups, having a molecular weight of from about 60 to 400 and an average functionality of from about 1.5 to about 3, wherein at least one of components a) and b) have an average functionality greater than 2.2, and the functionalities and quantities of components a) and b) are selected such that the molecular weight between crosslinks of the resultant polyurethane is from about 7,000 to about 16,000, the equivalent ratio of isocyanate groups to isocyanate-reactive groups present in the resultant polyurethane is from about 80:100 to about 120:100 and the urethane group content of the resultant polyurethane is from about 1 to 8%.

2. The composition of claim 1, wherein the urethane group content is from about 1 to about 7%.

3. The composition of claim 2, wherein the urethane group content is from about 2 to 6%.

4. The composition of claim 3, wherein the urethane group content is from about 2 to 4%.

5. The composition of claim 1, wherein the molecular weight between crosslinks is from about 8,000 to 16,000.

6. The composition of claim 5, wherein the molecular weight between crosslinks is from about 8,000 to 13,000.

7. The composition of claim 1, wherein component a) is an aliphatic diisocyanate or an aliphatic polyisocyanate adduct.

8. The composition of claim 7, wherein said aliphatic diisocyanate or said aliphatic polyisocyanate adduct is selected from the group consisting of an aliphatic diisocyanate consisting of isomers of bis(4-isocyanatocyclohexyl) methane, a biuret-group containing polyisocyanate prepared from 1,6-hexamethylene diisocyanate, and an aliphatic polyisocyanate consisting mainly of trimers of 1,6-hexamethylene diisocyanate.

9. A highly elastic polyurethane contact adhesive composition comprising:
   a) an isocyanate selected from the group consisting of:
      1) a polymethylene poly(phenyl isocyanate) having an isocyanate group content of from about 30 to 33% by weight, and a diphenylmethane diisocyanate content of from about 30 to 60% by weight, and
      2) a mixture of i) a polymethylene poly(phenyl isocyanate) having an isocyanate group content of from about 30 to 33% by weight and a diphenylmethane diisocyanate content of from about 30 to 60% by weight, with ii) a liquid reaction product of methylene bis(phenyl isocyanate), wherein said mixture has an isocyanate group content of from about 20 to 30% by weight, and
   b) a polyether selected from the group consisting of polyether diols, polyether triols and mixtures thereof, wherein the molecular weight of said polyether is from about 1,800 to about 12,000, wherein the functionalities and amounts of components a) and b) are such that the molecular weight between crosslinks is from about 7,000 to about 16,000 and the equivalent ratio of isocyanate groups to isocyanate-reactive groups is from about 80:100 to about 120:100 and the urethane group content is from about 1 to about 8%.

* * * * *